United States Patent
Otosaka

(10) Patent No.: US 8,820,121 B2
(45) Date of Patent: Sep. 2, 2014

(54) METHOD OF MANUFACTURING OPTICAL FIBER BASE MATERIAL

(75) Inventor: Tetsuya Otosaka, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 42 days.

(21) Appl. No.: 13/042,352

(22) Filed: Mar. 7, 2011

(65) Prior Publication Data

US 2011/0162413 A1 Jul. 7, 2011

Related U.S. Application Data

(63) Continuation of application No. PCT/JP2009/004466, filed on Sep. 9, 2009.

(30) Foreign Application Priority Data

Sep. 9, 2008 (JP) ................................. 2008-231373

(51) Int. Cl.
*C03B 37/018* (2006.01)
*C03B 37/014* (2006.01)
*C03B 37/012* (2006.01)

(52) U.S. Cl.
CPC ....... *C03B 37/01446* (2013.01); *C03B 2203/26* (2013.01); *C03B 2207/50* (2013.01); *C03B 2203/23* (2013.01); *C03B 37/01426* (2013.01); *C03B 37/01237* (2013.01); *C03B 2203/24* (2013.01); *C03B 37/0146* (2013.01); *C03B 37/0124* (2013.01); *C03B 2201/31* (2013.01); *C03B 2201/075* (2013.01); *C03B 37/01466* (2013.01); *C03B 2201/12* (2013.01)
USPC ................... 65/391; 65/429; 65/422; 65/426; 65/421

(58) Field of Classification Search
USPC ............................. 65/391, 429, 422, 426, 421
See application file for complete search history.

(56) References Cited

U.S. PATENT DOCUMENTS

| | | | | | |
|---|---|---|---|---|---|
| 4,440,558 | A | * | 4/1984 | Nath et al. ....................... | 65/391 |
| 4,689,212 | A | * | 8/1987 | Mansfield ...................... | 427/452 |
| 4,820,322 | A | * | 4/1989 | Baumgart et al. .............. | 65/412 |
| 4,822,136 | A | * | 4/1989 | Hicks, Jr. ...................... | 385/142 |
| 5,221,309 | A | * | 6/1993 | Kyoto et al. .................... | 65/416 |
| 5,522,007 | A | * | 5/1996 | Drouart et al. ................ | 385/141 |
| 6,131,414 | A | * | 10/2000 | Shimizu et al. ................. | 65/378 |
| 6,131,415 | A | * | 10/2000 | Chang et al. .................... | 65/391 |
| 6,536,240 | B1 | * | 3/2003 | Gouskov et al. ................ | 65/391 |
| 6,813,907 | B2 | * | 11/2004 | Dawes et al. .................... | 65/397 |
| 7,089,766 | B2 | * | 8/2006 | Burke et al. .................... | 65/414 |
| 7,854,145 | B2 | * | 12/2010 | Gonnet et al. ................... | 65/391 |
| 2002/0073740 | A1 | * | 6/2002 | Dawes et al. ................... | 65/397 |
| 2002/0197035 | A1 | * | 12/2002 | Early et al. ..................... | 385/123 |
| 2005/0257570 | A1 | * | 11/2005 | Schmidt et al. ................. | 65/391 |
| 2006/0039665 | A1 | | 2/2006 | Matsuo et al. | |
| 2007/0044513 | A1 | * | 3/2007 | Kear et al. ...................... | 65/17.6 |
| 2007/0280615 | A1 | | 12/2007 | de Montmorillon et al. | |
| 2010/0021117 | A1 | | 1/2010 | de Montmorillon et al. | |

FOREIGN PATENT DOCUMENTS

| | | |
|---|---|---|
| CN | 101055330 A | 10/2007 |
| CN | 101097273 A | 1/2008 |
| EP | 1 845 399 A1 | 10/2007 |
| JP | H10-206669 A | 8/1999 |
| JP | 2003-226539 A | 8/2003 |
| JP | 3853833 B2 | 12/2006 |
| JP | 2007-45643 A | 2/2007 |
| JP | 2007-048514 A | 2/2007 |
| JP | 2007-279739 A | 10/2007 |
| TW | 425481 B | 3/2001 |
| WO | 2006/106068 A2 | 10/2006 |
| WO | 2007/017977 A1 | 2/2007 |

OTHER PUBLICATIONS

Ikeda et al., "Low Bending Loss Optical Fiber with Reduced Splice Loss", Fujikura Technical Review, Oct. 2003, No. 105, pp. 6-10, Japan. Mentioned on p. 2 of the as-filed specification and English abstract included as a concise explanation of relevance.

International Search Report (ISR) issued in PCT/JP2009/004466 (parent application) mailed in Jan. 2010 for Examiner consideration, citing U.S. Patent Application Publication Nos. 1-2 and Foreign Patent document Nos. 1-5.

Written Opinion (PCT/ISA/237) issued in PCT/JP2009/004466 (parent application) mailed in Jan. 2010.

* cited by examiner

*Primary Examiner* — John Hoffman

(57) ABSTRACT

Provided is a method of manufacturing an optical fiber base material having at least four layer including a core, a first cladding, a second cladding containing fluorine, and a third cladding. The manufacturing method comprises preparing a starting base material that includes the core and the first cladding; forming a porous intermediate glass base material by supplying glass raw material and oxygen to a high-frequency induction thermal plasma torch to synthesize glass fine particles that are then deposited on a surface of the starting base material; forming an intermediate glass base material that includes the core, the first cladding, and the second cladding containing fluorine, by heating and vitrifying the porous intermediate glass base material in an atmosphere containing fluorine; and providing the third cladding on the outer surface of the intermediate glass base material.

8 Claims, 6 Drawing Sheets

METHOD OF MANUFACTURING OPTICAL FIBER BASE MATERIAL

TECHNICAL FIELD

The present invention relates to a method of manufacturing an optical fiber base material using a high-frequency induction thermal plasma torch. In particular, the present invention relates to a method of manufacturing a glass base material for a flexible single-mode optical fiber with low OH content. The contents of the following patent applications are incorporated herein by reference, Japanese Patent Application No. 2008-231373 filed on Sep. 9, 2008, and International Application PCT/JP2009/004466 filed on Sep. 9, 2009.

BACKGROUND ART

In recent years, broad band access, such as Fiber To The Home (FTTH) has been expanding and progressing. In current in-home wiring arrangements, a UTP cable or a wireless setup is usually used, but in order to achieve greater broadband transmission, direct connection of optical fiber in offices and homes is being considered.

The allowable bend radius for conventional single-mode optical fiber, as defined by ITU-T G652, is a minimum of 30 mm. If a bend radius less than this is applied, the amount of loss is increased and the transmission signal decays.

When considering wiring in homes, which can involve running the optical fiber along a wall and often subjects the optical fiber to rough treatment, it is unrealistic to arrange the wiring in a manner that such a large curvature radius is always maintained. Therefore, single-mode optical fiber is desired with good flexibility, sufficient for preventing an increase in loss due to a smaller bend radius, and such optical fiber is actually being developed and sold. Here, "flexible" means that the optical fiber can bend without incurring a significant increase in transmission loss.

In apparatuses used in the offices of telecommunication providers, flexible single-mode optical fiber allowing for a smaller bend radius is used to make these apparatuses more compact.

The flexible single-mode optical fiber can be realized by simply increasing the refractive index of the core in the conventional single-mode optical fiber. In this case, however, the mode field diameter is decreased. Therefore, there is a problem of increased connection loss with standard single-mode optical fiber.

Japanese Patent No. 3,853,833 and Fujikura Technical Review No. 105 (pp. 6-10) disclose flexible single-mode optical fiber to solve the above problem. This single mode optical fiber has high flexibility and a mode field diameter that is close to that of standard single-mode optical fiber. As shown in FIG. 1, the refractive index distribution of this optical fiber is made up of four layers including a core 100, a first cladding 101, a second cladding 102, and a third cladding 103, and when the refractive indexes of these layers are respectively set to $n_0$, $n_1$, $n_2$, and $n_3$, the core is doped with germanium until $n_0$ becomes greater than $n_3$. Furthermore, the second cladding 102 is doped with fluorine until $n_2$ becomes less than $n_3$. The third cladding 103 is formed of pure quartz. The first cladding 101 is doped with a dopant to raise or lower the refractive index thereof as needed.

Japanese Patent Application Publication No. 2007-279739 also discloses a flexible single-mode optical fiber, but this optical fiber has a refractive index distribution that is similar to that of the optical fiber disclosed in Japanese Patent No. 3,853,833. Japanese Patent Application Publication No. 2007-45643 discloses a method for manufacturing a pure silica core fiber that has low OH content, using a high-frequency induction thermal plasma torch.

DISCLOSURE OF THE INVENTION

Problems to be Solved by the Invention

The refractive index distribution of the types of optical fiber described above is commonly referred to as a trench distribution, and is a characteristic caused by the fluorine-doped layer of the second cladding. The following techniques are known for manufacturing the types of optical fiber base material described above.

(1): MCVD Technique

This involves providing a raw material gas inside a glass tube, causing a reaction in the raw material gas by using a flame to heat the glass tube from the outside, and thereby depositing a glass film on the inner wall of the glass tube.

This technique is usually used to synthesize an optical fiber base material with a complicated refractive index distribution. However, the OH groups emitted from the flame enter into the glass tube through the outer wall, and the end result is that transmission loss near 1385 nm in the optical fiber is increased.

(2) PCVD Technique

This involves providing a raw material gas inside a glass tube, causing a reaction in the raw material gas to generate plasma in the glass tube by emitting microwaves from outside the glass tube, and thereby depositing a glass film on the inner wall of the glass tube. The PCVD technique can be used to synthesize an optical fiber base material with a finer refractive index distribution than an optical fiber base material formed using the MCVD technique.

Since this method does not use a flame, the there is no worry that the OH groups will enter into the glass tube through the outer wall. However, since the purity of the glass film deposited in the glass tube is determined by the purity of the glass raw material, transmission loss near 1385 nm in the optical fiber is increased if there are impurities containing hydrogen in the raw material. In particular, the glass raw material $SiCl_4$ is highly reactive to water, and therefore it is difficult to manufacture a low OH optical fiber since the OH groups are easily formed.

(3): OVD Technique or Axial Deposition Technique

These techniques involve depositing glass fine particles, which are generated by applying flame hydrolysis to glass raw material in an oxyhydrogen flame, on the outer surface of a starting base material having a core and a first cladding. After this, the result of the deposition is dehydrated in an atmosphere containing chlorine, changed into transparent glass in an atmosphere containing fluorine to synthesize a second cladding layer, and a third cladding layer is then provided.

This technique is beneficial for productivity, but since an oxyhydrogen flame is used when depositing the glass fine particles of the second cladding, OH groups enter into the starting base material through the outer surface thereof. Furthermore, OH groups enter into the starting base material through the outer surface thereof during a flame polishing process performed before the deposition. During the dehydration process, the OH groups in the deposited porous glass layer are removed, but it is difficult to manufacture low OH optical fiber because the OH groups that have entered into the starting base material are not removed.

(4): "Tube Jacket" Technique

This technique involves layering glass rods or tubes and applying heat to form the layers integrally, and this technique can decrease the OH content because each rod and tube can be manufactured using the OVD technique or VAD technique. However, the OH groups are easily generated in the surfaces of the rods and tubes and cannot be sufficiently removed during the integration through heating, and it is also easy for the OH groups to enter the rods or tubes from the atmosphere or the oxyhydrogen flame serving as the heat source, and therefore it is difficult to manufacture low OH optical fiber with this method.

As described above, none of the above methods can easily solve the problem of OH groups entering into the optical fiber.

In JP 3,853,833 described above, Embodiments 1, 2, and 4 involve manufacturing flexible single-mode optical fiber using technique (3), and Embodiment 3 uses technique (1). However, there is no mention made of the transmission lose near 1385 nm.

JP 2007-45643, described above, discloses a pure silica core fiber with low OH content formed using a high-frequency induction thermal plasma torch, but there is no mention of the trench distribution appearing in the flexible single-mode fiber.

Most of the optical fiber used in current transmission paths is single-mode optical fiber with decreased OH groups, and is referred to as Low Water Peak Fiber (LWPF). This type of optical fiber does not have a high-loss region occurring near 1385 nm because of OH groups, and therefore there is low loss across the range from 1300 nm to 1600 nm to enable reliable transmission.

Despite the fact that the LWPF used in most transmission lines can transmit near 1385 nm, as described above, there is no means of decreasing OH groups that is effective in trench-type flexible single-mode optical fiber used in homes or offices. Therefore, a method is desired for manufacturing, at low cost, trench-type flexible single-mode optical fiber and decreased OH groups.

It is an objective of the present invention to provide a method for manufacturing an optical fiber base material for obtaining optical fiber that has a trench-type refractive index distribution, low transmission loss, low connection loss with respect to standard single-mode optical fiber, and good flexibility.

Means for Solving the Problems

According to a first aspect of the present invention, provided is a method of manufacturing an optical fiber base material having at least four layer including a core, a first cladding, a second cladding containing fluorine, and a third cladding. The manufacturing method comprises preparing a starting base material that includes the core and the first cladding; forming a porous intermediate glass base material by supplying glass raw material and oxygen to a high-frequency induction thermal plasma torch to synthesize glass fine particles that are then deposited on a surface of the starting base material; forming an intermediate glass base material that includes the core, the first cladding, and the second cladding containing fluorine, by heating and vitrifying the porous intermediate glass base material in an atmosphere containing fluorine; and providing the third cladding on the outer surface of the intermediate glass base material.

Preparing the starting base material may include (i) forming a porous glass base material having the core and the first cladding using a VAD technique, (ii) performing dehydration by heating the porous glass base material in an atmosphere containing chlorine, (iii) forming the glass base material by heating the dehydrated porous glass base material in a helium atmosphere to change the porous glass base material into transparent glass, (iv) extending the glass base material to adjust an outer diameter of the glass base material by heating the glass base material, and (v) removing a surface of the extended glass base material.

Removing the surface preferably includes performing one of machine polishing, wet etching with hydrofluoric acid, and dry etching with a plasma flame including fluorine.

The high-frequency induction thermal plasma torch preferably includes a gas induction portion with a multiple tube structure when forming the porous intermediate glass base material, the high-frequency induction thermal plasma torch includes a gas induction portion with a multiple tube structure. The glass raw material is preferably supplied from outside the torch flame toward the torch flame, from a raw material nozzle arranged outside the torch flame.

The summary clause does not necessarily describe all necessary features of the embodiments of the present invention. The present invention may also be a sub-combination of the features described above.

BEST MODE FOR CARRYING OUT THE INVENTION

Hereinafter, some embodiments of the present invention will be described. The embodiments do not limit the invention according to the claims, and all the combinations of the features described in the embodiments are not necessarily essential to means provided by aspects of the invention.

Figure 2:
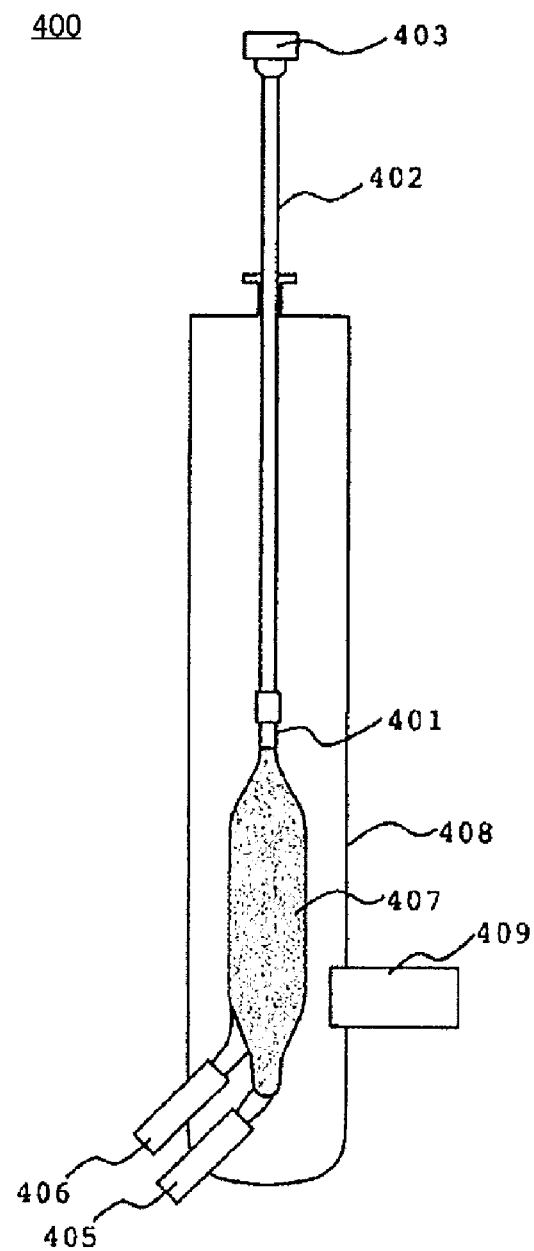
FIG. 2 is a schematic view of a porous glass base material manufacturing apparatus 400.

FIG. 2 schematically shows an apparatus 400 for manufacturing porous glass base material to be used as a starting base material, using the VAD technique. The porous glass base material manufacturing apparatus 400 includes a shaft 402, a core burner 405, a first cladding burner 406, a chamber 408, and an exhaust tube 409.

The target 401 is mounted on the shaft 402, and the shaft is connected to the rotating, raising, and lowering device 403. The core burner 405 is supplied with oxygen, hydrogen, silicon tetrachloride, germanium tetrachloride, and argon, and synthesizes glass fine particles that include germanium in an oxyhydrogen flame.

The glass fine particles including germanium are deposited on the tip of the target 401. The rotating, raising, and lowering device 403 adjusts the raising speed of the target 401 such that the positional relationship between the deposition surface and the core burner 405 remains constant.

The first cladding burner 406 is supplied with oxygen, hydrogen, silicon tetrachloride, and argon, and deposits the glass fine particles synthesized in the oxyhydrogen flame onto the core. The first cladding burner 406 may be supplied with dopants such as germanium tetrachloride or silicon tetrafluoride as necessary.

In this way, the porous glass base material 407 is synthesized in the chamber 408 by the core burner 405 and the first cladding burner 406, and the glass fine particles that were not deposited on the porous glass base material 407, i.e. excess soot, are expelled to the outside through the exhaust tube 409.

The porous glass base material 407 including the core and the first cladding is preferably manufactured using the VAD technique in this way. With the VAD technique, the starting base material can be synthesized such that there is no hole in the center of the core and the maximum amount of OH groups can be removed during the dehydration and vitrification step, and therefore the VAD technique is suitable for manufacturing low OH optical fiber.

Figure 3:
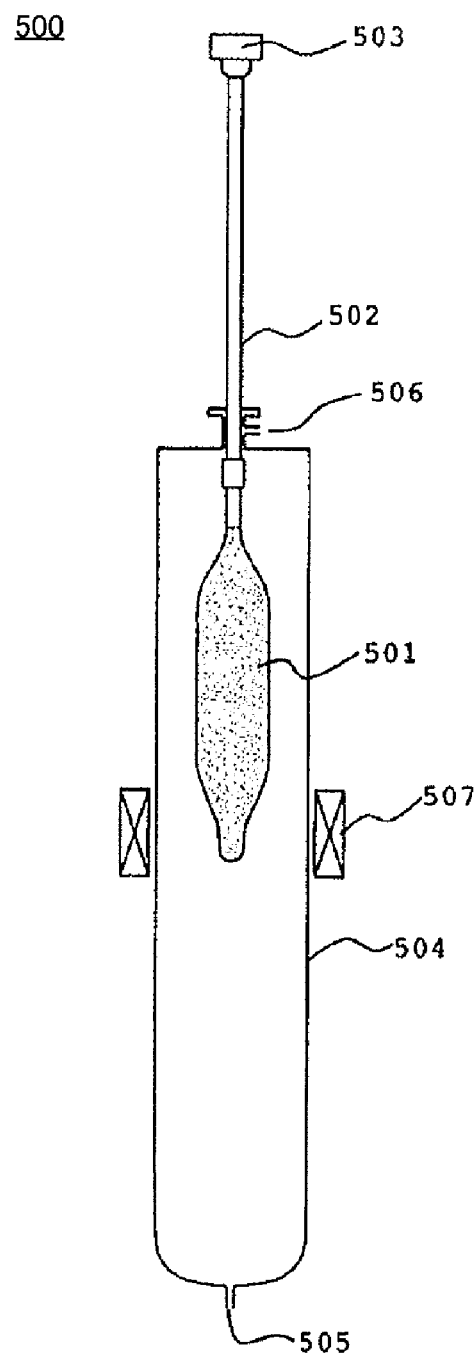
FIG. 3 is a schematic view of an exemplary dehydrating and vitrifying apparatus 500.

FIG. 3 shows a dehydrating and vitrifying apparatus 500. The dehydrating and vitrifying apparatus 500 includes a shaft 502, a rotating, raising, and lowering device 503, a core tube 504, a gas induction opening 505, an exhaust outlet 506, and a heating furnace 507.

The porous glass base material obtained by the porous glass base material manufacturing apparatus 400 performing deposition up to a desired length undergoes dehydration and vitrification processing by the dehydrating and vitrifying apparatus 500 shown in FIG. 3. The porous glass base material 501 is arranged in the core tube 504 and is connected to the rotating, raising, and lowering device 503 via the shaft 502. A dehydrating gas, such as chlorine diluted with helium gas, is introduced into the core tube 504 from the gas induction opening 505, and expelled from the exhaust outlet 506.

In this state, the heating furnace 507 is heated to between 900° and 1200° Celsius, and the dehydration process is performed by the rotating, raising, and lowering device 503 gradually lowering the porous glass base material 501 while rotating. After the dehydration process has been completed for the entire porous glass base material 501, the porous glass base material 501 is raised back up and the core tube is supplied with helium gas from the gas induction opening 505. In this state, the heating furnace 507 is heated to between 1300° and 1600° Celsius, and the vitrification process is performed by gradually lowering and rotating the porous glass base material 501. As a result, the glass base material is obtained.

The helium gas used in the vitrification process may be mixed with a gas containing fluorine, such as silicon tetrafluoride, sulfur hexafluoride, and carbon tetrafluoride, as needed. It is especially necessary, when supplying the gas during the vitrification process, to use a gas that does not include hydrogen such as hydrocarbon or water. Therefore, the helium gas or the like preferably undergoes purification processing before being introduced to the dehydrating and vitrifying apparatus.

The glass base material obtained by using the vertically-oriented dehydrating and vitrifying apparatus has an outer diameter distribution along its longitude that is affected by gravity. Therefore, if the second cladding layer is deposited on the starting base material glass preform as-is, there will be a spread in the ratio between the thickness of the second cladding layer and the thickness of the first cladding layer and the core. Accordingly, before applying the second cladding layer, the glass base material is preferably thermally extended to have a constant outer diameter. The thermal extension can be achieved by using a general glass lathe or an electric extension furnace during the processing of the optical fiber preform.

In the thermal extension process, the impurities affixed to the surface of the glass base material are diffused into the glass base material, as are the OH groups from the flame of the glass lathe. Therefore, a process for removing the surface layer is preferably performed after the extension.

The removal of the surface layer can be achieved using widely known techniques such as machine polishing, wet etching with hydrofluoric acid, and dry etching with a plasma flame including fluorine. The necessary etching amount depends on the depth to which the impurities penetrate during the thermal extension process, and therefore is not a predetermined amount. However, removing 0.03 mm to 2 mm is usually sufficient.

Figure 4:
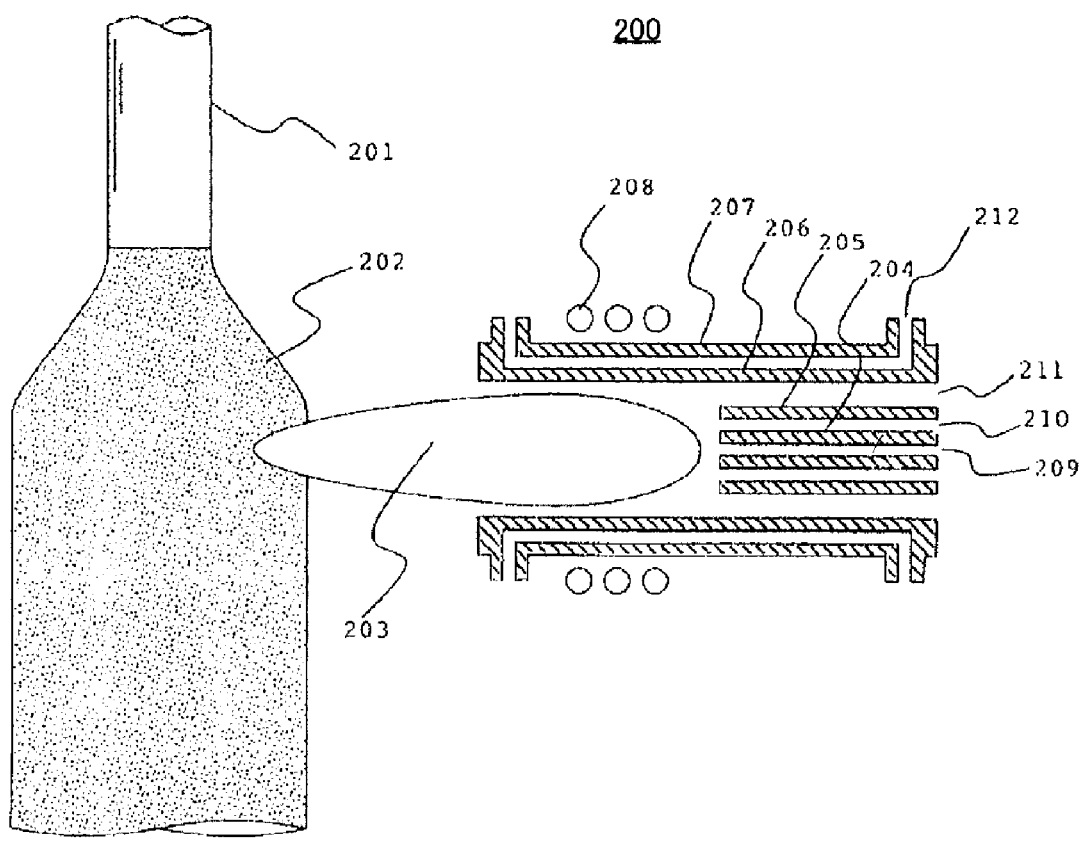
FIG. 4 is a schematic cross-sectional view of an exemplary plasma torch 200.

FIG. 4 shows an exemplary plasma torch 200. The plasma torch 200 includes a starting base material 201, a porous glass 202, a first tube 204, a second tube 205, a third tube 206, a fourth tube 207, a high-frequency coil 208, and flow paths 209 to 212.

FIG. 4 shows a schematic cross section of the plasma torch 200 used when depositing the second cladding. The plasma torch 200 includes multiple coaxial tubes, and FIG. 4 shows a view in which the plasma torch 200 is cleaved along its central axis. The plasma torch generates induction thermal plasma 203, referred to hereinafter simply as "plasma," synthesizes quartz glass fine particles by causing a raw material gas to react in the plasma, and deposits the quartz glass fine particles as a cladding layer on the starting base material 201 moving up and down while rotating, thereby forming the porous glass 202.

The plasma torch 200 includes the first tube 204, the second tube 205, the third tube 206, the fourth tube 207, and the high-frequency coil 208. The flow path 209 is supplied with silicon tetrachloride and argon, the flow path 210 is supplied with argon, and the flow path 211 is supplied with oxygen and argon. The flow path 212 is supplied with cold water.

The gases flowing through the flow paths 209 to 211 experience induction from the high-frequency coil 208 to become plasma, and become the induction thermal plasma 203 with a temperature reaching above several thousand degrees Celsius. Since hydrogen is not supplied in the plasma, the OH groups do not substantially enter into the starting base material 201.

Figure 5:
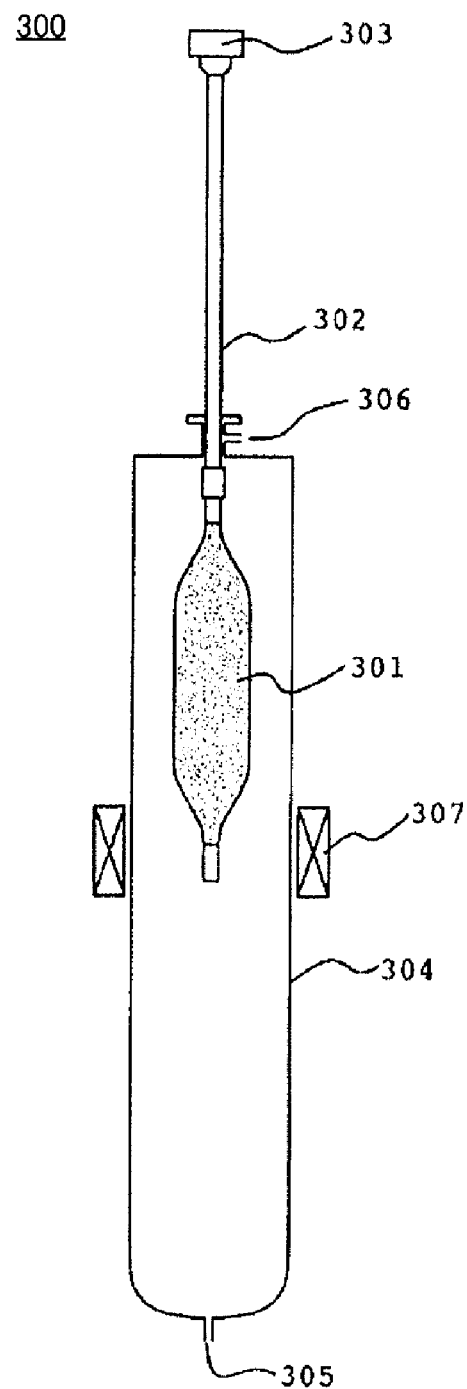
FIG. 5 is a schematic cross-sectional view of an exemplary dehydrating and vitrifying apparatus 300.

FIG. 5 shows a dehydrating and vitrifying apparatus 300. The dehydrating and vitrifying apparatus 300 includes a shaft 302, a rotating, raising, and lowering device 303, a core tube 304, a gas induction opening 305, an exhaust outlet 306, and a heating furnace 307. The porous intermediate glass base material 301 including the porous glass 202 obtained as described above undergoes dehydration process and vitrification processing by the dehydrating and vitrifying apparatus 300 shown in FIG. 5.

The porous intermediate glass base material 301 is arranged within the core tube 304 and is connected to the rotating, raising, and lowering device 303 via the shaft 302. A dehydrating gas, such as chlorine diluted with helium gas, is introduced into the core tube 304 from the gas induction opening 305, and expelled from the exhaust outlet 306. In this state, the heating furnace 307 is heated to between 900° and 1200° Celsius, and the dehydration process is performed by the rotating, raising, and lowering device 303 gradually lowering the porous intermediate glass base material 301 while rotating.

After the dehydration process has been completed for the entire porous intermediate glass base material 301, the porous intermediate glass base material 301 is raised back up. The core tube 304 is then supplied with a gas including fluorine from the gas induction opening 305, as needed. This gas containing fluorine may be silicon tetrafluoride or sulfur hexafluoride doped with helium, carbon tetrafluoride, or the like. In this state, the heating furnace 307 is heated to between 1300° and 1600° Celsius and the vitrification process is performed by the rotating, raising, and lowering device 303 gradually lowering and rotating the porous intermediate glass base material 301. As a result, the glass base material is obtained.

The gas supplied during the vitrification process must be a gas that does not include hydrogen such as hydrocarbon or water. Therefore, the helium gas and the gas containing fluorine preferably undergo purification processing before being introduced to the dehydrating and vitrifying apparatus. The purification processing can be achieved using a commercial gas generating apparatus, such as an apparatus from the non-volatile gas purifier UIP series manufactured by Japan Pionics.

Figure 1:
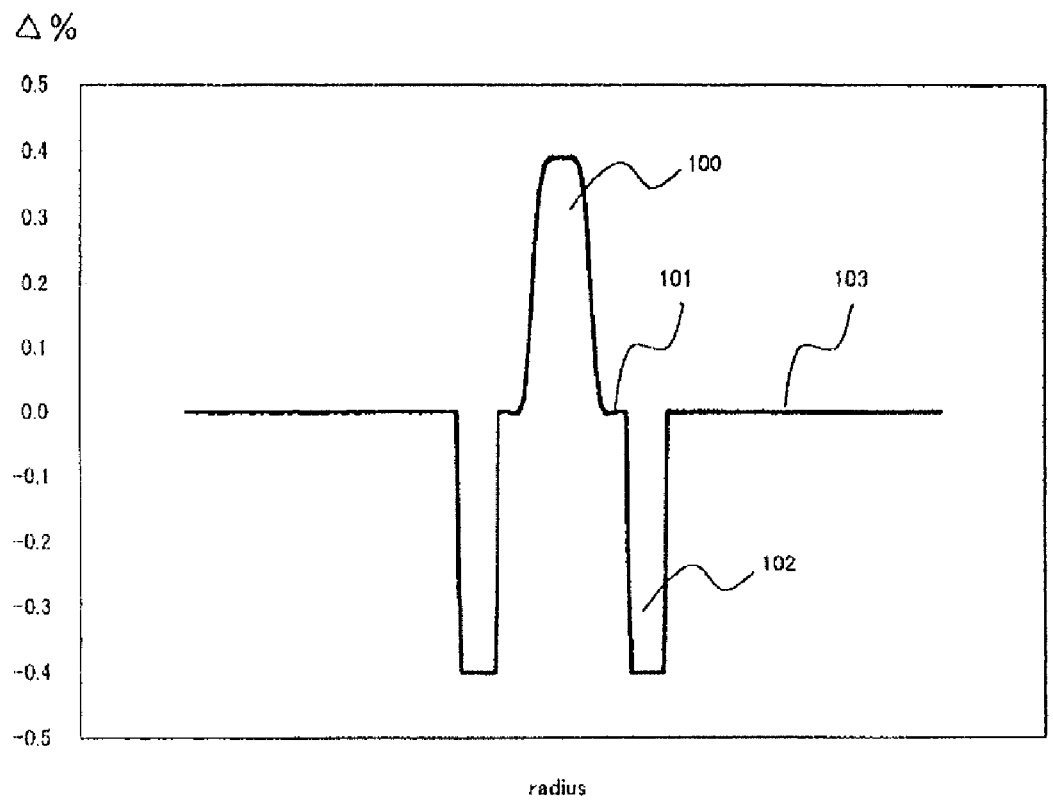
FIG. 1 is a schematic view of the refractive index distribution of an optical fiber base material.

The intermediate glass base material includes the materials serving as the core 100, the first cladding 101, and the second cladding 102 in the refractive index distribution shown in FIG. 1. The third cladding 103 is formed on the outer surface of the intermediate glass base material using a widely known technique such as OVD, axial VAD, tube jacket, or the like. Before applying the third cladding, a surface removal process of an extension process for adjusting the outer diameter may be applied as needed.

Figure 6:
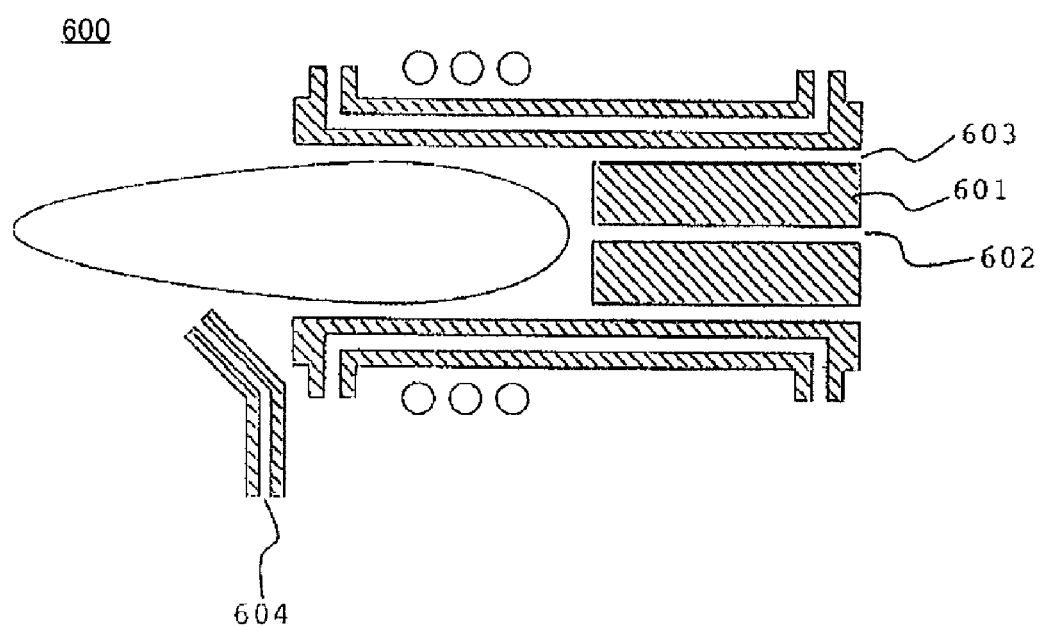
FIG. 6 is a schematic cross-sectional view of another exemplary plasma torch 600.

FIG. 6 shows a schematic cross section of a plasma torch 600 having a different structure. As shown in FIG. 6, the induction thermal plasma torch 600 does not have a multiple tube structure. The plasma torch 600 includes a raw material induction portion 601, flow paths 602 and 603, and a raw material nozzle 604.

When the flow path 602 in the center of the raw material induction portion 601 is supplied with silicon tetrachloride and argon and the flow path 603 is supplied with oxygen and argon, the surface area of the tip of the raw material induction portion 601 becomes large, and it is easy for current swirling to occur in the plasma torch. Therefore, the generated glass fine particles become affixed to the tip of the raw material induction portion and the inner wall of the plasma torch, and it is difficult to achieve stable plasma. Therefore, by supplying the argon gas as a carrier and silicon tetrachloride as the raw material through the raw material nozzle 604 arranged outside the plasma torch, instead of through the flow path 602, stabilized deposition can be achieved with the induction thermal plasma torch that does not have a multiple tube structure.

In the induction thermal plasma torch 200 having the multiple tube structure shown in FIG. 4, the surface area of the tips of the first tube 204 and the second tube 205 are small. Therefore, current swirling is unlikely to occur in the torch, and the generated glass fine particles proceed straight toward the starting base material and do not return to the upstream portion of the torch. Accordingly, stable glass deposition can be achieved.

First Embodiment:

The glass base material manufacturing apparatus 400 shown in FIG. 2 was used to synthesize a porous glass base material using the VAD technique. Next, the porous glass base material was placed in the apparatus shown in FIG. 3, dehydration was performed by heating the porous glass base material to 1100° Celsius in a helium atmosphere containing 3% chlorine, and the vitrification process was then performed by heating the porous glass base material to 1520° Celsius in a helium atmosphere, thereby synthesizing a glass base material.

The obtained glass base material is formed of a core that includes germanium and a first cladding portion that does not include a dopant. The OH group content of this glass base material was no greater than 0.15 ppb, which is extremely low.

This glass base material was heated and extended in an electric furnace with a nitrogen atmosphere. A surface thickness of 0.5 mm was machine polished therefrom to form a core rod with an outer diameter of 21 mm and a length of 1000 mm, which was then used as the starting base material.

Quartz glass dummy rods were connected to the ends of the core rod, and the plasma torch shown in FIG. 4 was used to deposit glass fine particles around the starting base material while the starting base material was rotated at 30 rpm and moved up and down at 75 mm/min. The high-frequency coil 208 was supplied with high-frequency power of 3.5 MHz and 9 kW, the flow path 209 was supplied with silicon tetrachloride at 4 L/min and argon at 4 L/min, the flow path 210 was supplied with argon at 20 L/min, and the flow path 211 was supplied with argon at 30 L/min and oxygen at 40 L/min. After a deposition time of 250 minutes, a porous intermediate glass base material was obtained with an attached deposition mass of 1430 g and an outer diameter of 77 mm.

The dehydration process was performed by heating the porous intermediate glass base material to 1100° Celsius in a helium atmosphere containing 3% chlorine, and the vitrification process was then performed by heating the porous intermediate glass base material to 1480° Celsius in a helium atmosphere containing 11% silicon tetrafluoride, thereby obtaining an intermediate glass base material including a second cladding formed on the starting base material that has the core and the first cladding.

A porous glass base material was created by using the normal OVD process to deposit glass fine particles on the outer surface of the intermediate glass base material obtained in the above manner. An optical fiber base material having a third cladding was then formed by performing the dehydration process that involves heating the porous glass base material to 1100° Celsius in a helium atmosphere containing 3% chlorine and performing the vitrification process that involves heating the porous glass base material to 1520° Celsius in a helium atmosphere.

This optical fiber base material had a refractive index distribution such as shown in FIG. 1. An optical fiber preform was formed by heating this base material to approximately 2100° Celsius and drawing the heated base material. The transmission loss of the resulting optical fiber at 1385 nm was 0.28 dB/km and the loss increase due to the OH absorption was approximately 0.01 dB/km, which is small enough. The mode filed diameter at 1310 nm was 9.32 µm and the cutoff wavelength was 1250 nm, which are suitable specifications for matching standard single-mode optical fiber. Furthermore, the loss at 1550 nm for a bend radius of 20 mm was 0.1 dB/m, which is low.

In this way, the optical fiber obtained by drawing the optical fiber base material described above has a trench-type refractive index distribution, reduced OH groups, extremely low transmission loss, and a mode field and cutoff wavelength suitable for matching with standard single-mode optical fiber. Furthermore, this optical fiber has good flexibility and low additional loss from a small bend radius. As a result, this optical fiber enables further progress in optical communication.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The invention claimed is:

1. A method of manufacturing an optical fiber base including a core, a first cladding, and a second cladding, the manufacturing method comprising:
preparing a starting base that includes the core and the first cladding covering the core;
thereafter, forming a porous glass base by supplying glass raw material and oxygen to an induction thermal plasma torch including a gas induction portion with a multiple coaxial tube structure and depositing glass fine particles synthesized by the induction thermal plasma torch on a surface of the starting base; and
thereafter, vitrifying the deposited glass fine particles in an atmosphere containing fluorine by heating the porous glass base in the atmosphere containing fluorine, thereby forming a glass base that includes a second cladding containing fluorine and covering the first cladding, wherein
said preparing the starting base includes:
extending the starting base to adjust an outer diameter of the starting base by heating the starting base; and
removing a surface adjacent to a surface of the extended starting base, said removing the surface including performing one or more processes selected from the group consisting of machine polishing and wet etching with hydrofluoric acid.

2. The manufacturing method according to claim 1, further comprising
forming a third cladding that covers the second cladding.

3. The manufacturing method according to claim 1, wherein
said preparing the starting base includes forming a porous starting base using a VAD technique to deposit material of the first cladding on the core.

4. The manufacturing method according to claim 3, wherein
said preparing the starting base includes performing dehydration by heating the porous starting base in an atmosphere containing chlorine.

5. The manufacturing method according to claim 4, wherein
said preparing the starting base includes forming the starting base by heating the dehydrated porous starting base in a helium atmosphere to change the porous starting base into transparent glass.

6. The manufacturing method according to claim 1, wherein
the glass raw material and oxygen are individually introduced to the induction thermal plasma torch.

7. The manufacturing method according to claim 1, wherein
when forming the porous glass base, the induction thermal plasma torch includes a raw material nozzle outside the torch flame, and the glass raw material is supplied from outside the torch flame toward the torch flame.

8. The manufacturing method according to claim 1, wherein
said vitrifying comprises heating a heating furnace to between 1300° and 1600° Celsius and lowering and rotating the porous glass base in the atmosphere containing fluorine.

* * * * *